US008918145B2

(12) United States Patent
Ashrafi

(10) Patent No.: US 8,918,145 B2
(45) Date of Patent: Dec. 23, 2014

(54) SYSTEM AND METHOD FOR SELECTION OF WIRELESS SERVICE PROVIDER VIA A MOBILE TERMINAL

(71) Applicant: MetroPCS Wireless, Inc., Richardson, TX (US)

(72) Inventor: Solyman Ashrafi, Plano, TX (US)

(73) Assignee: MetroPCS Wireless, Inc., Richardson, TX (US)

( * ) Notice: Subject to any disclaimer, the term of this patent is extended or adjusted under 35 U.S.C. 154(b) by 0 days.

(21) Appl. No.: 14/165,145

(22) Filed: Jan. 27, 2014

(65) Prior Publication Data
US 2014/0256320 A1    Sep. 11, 2014

Related U.S. Application Data

(62) Division of application No. 13/785,361, filed on Mar. 5, 2013, now Pat. No. 8,694,055.

(51) Int. Cl.
| | |
|---|---|
| H04B 1/38 | (2006.01) |
| H04W 60/00 | (2009.01) |
| H04L 29/08 | (2006.01) |
| G06F 3/048 | (2013.01) |
| H04M 1/00 | (2006.01) |
| H04W 4/00 | (2009.01) |
| H04W 48/00 | (2009.01) |

(52) U.S. Cl.
CPC ............... *H04W 60/00* (2013.01); *H04L 67/16* (2013.01); *G06F 3/048* (2013.01); *H04B 1/38* (2013.01); *H04M 1/00* (2013.01); *H04W 4/001* (2013.01); *H04W 48/00* (2013.01); *H04L 67/02* (2013.01); *H04L 67/28* (2013.01)
USPC ...... 455/558; 455/414.1; 455/435.1; 455/557; 455/552.1; 455/556.2; 455/550.1

(58) Field of Classification Search
CPC . G06F 3/048; H04B 1/3816; H04L 29/08108; H04L 67/28; H04L 67/16; H04L 67/02; H04M 1/00; H04W 48/00; H04W 4/001; H04W 60/00
USPC ................ 455/414.1, 435.1, 558, 557, 552.1, 455/556.2, 550.1
See application file for complete search history.

(56) References Cited

U.S. PATENT DOCUMENTS

| | | | |
|---|---|---|---|
| 7,616,966 B2 | 11/2009 | Nguyen | |
| 8,335,838 B2 * | 12/2012 | Zhang et al. | 709/218 |

(Continued)

FOREIGN PATENT DOCUMENTS

| | | | |
|---|---|---|---|
| EP | 1777978 A1 * | 4/2007 | |
| WO | 03100670 A1 | 12/2003 | |

OTHER PUBLICATIONS

Patent Cooperation Treaty: International Search Report and Written Opinion for PCT/US20141017167; N. Lavrentieva; Apr. 24, 2014; 6 pages.

*Primary Examiner* — Khai M Nguyen
(74) *Attorney, Agent, or Firm* — Howison & Arnott, LLP

(57) ABSTRACT

A system and method for provisioning a wireless service provider through a mobile device using a SIM card within the mobile device accesses a server via a wireless hub using the SIM card and requests comparison data relating to a plurality of wireless service providers. The comparison data is provided to the mobile device from the server responsive to the request, and the mobile device displays this comparison information. A user selection is provided selecting a particular wireless service provider using the mobile device, and the selected wireless service provider is established as the wireless service provider for the mobile device.

19 Claims, 3 Drawing Sheets

(56) References Cited

U.S. PATENT DOCUMENTS

| | | | |
|---|---|---|---|
| 2005/0256962 A1* | 11/2005 | Mischler et al. | 709/230 |
| 2006/0079284 A1* | 4/2006 | Lu et al. | 455/558 |
| 2006/0166668 A1 | 7/2006 | Choi et al. | |
| 2010/0121736 A1 | 5/2010 | Kalke | |
| 2012/0252443 A1 | 10/2012 | Zheng et al. | |
| 2012/0270549 A1 | 10/2012 | Zinn et al. | |
| 2012/0302218 A1 | 11/2012 | Tsuda et al. | |
| 2013/0235766 A1 | 9/2013 | Raleigh | |

* cited by examiner

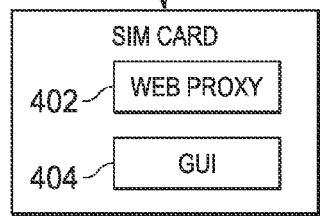

FIG. 4

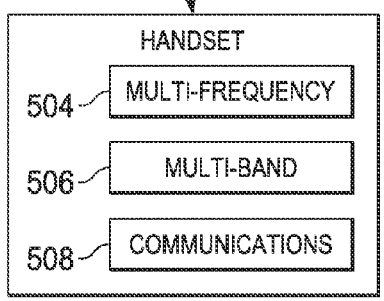

FIG. 5

```
┌─────────────────────────────┐
│      PURCHASE PHONE         │──702
└─────────────┬───────────────┘
┌─────────────▼───────────────┐
│ INSTALL NON-PROVISIONED SIM CARD │──704
└─────────────┬───────────────┘
┌─────────────▼───────────────┐
│   ESTABLISH WiFi            │──706
│   CONNECTION WITH PHONE     │
└─────────────┬───────────────┘
┌─────────────▼───────────────┐
│ WEB PROXY ACCESSES SERVER   │──708
│ FOR PROVIDER PROVISIONING   │
└─────────────┬───────────────┘
┌─────────────▼───────────────┐
│    FETCH PROVIDER INFO      │──710
└─────────────┬───────────────┘
┌─────────────▼───────────────┐
│  DISPLAY PROVIDER INFO      │──712
│  IN COMPARATIVE MATRIX      │
└─────────────┬───────────────┘
┌─────────────▼───────────────┐
│   SELECT SERVICE PROVIDER   │──714
└─────────────┬───────────────┘
┌─────────────▼───────────────┐
│   SELF ACTIVATE PHONE       │──716
│   WITH SERVICE PROVIDER     │
└─────────────┬───────────────┘
┌─────────────▼───────────────┐
│         COMPLETE            │──718
└─────────────────────────────┘
```

FIG. 7

| | MONTHLY FEE | SERVICES | | | | SELECT |
|---|---|---|---|---|---|---|
| SP1 | | | | | | ☐ |
| SP2 | | | | | | ☐ |
| SP3 | | | | | | ☐ |
| SP4 | | | | | | ☐ |
| SP5 | | | | | | ☐ |

FIG. 6

SYSTEM AND METHOD FOR SELECTION OF WIRELESS SERVICE PROVIDER VIA A MOBILE TERMINAL

CROSS-REFERENCE TO RELATED APPLICATIONS

This application is a division of U.S. patent application Ser. No. 13/785,361, filed Mar. 5, 2013, entitled SYSTEM AND METHOD FOR SELECTION OF WIRELESS SERVICE PROVIDER VIA A MOBILE TERMINAL, the specification of which is incorporated by reference herein in its entirety.

TECHNICAL FIELD

The present invention relates to the selection of a wireless service provider for providing wireless services to a mobile terminal, and more particularly, to a system and method for using the mobile terminal to select the wireless service provider.

BACKGROUND

When an individual purchases a mobile terminal, they purchase a mobile terminal that is associated with a particular wireless service provider. That is, if the user is going to have AT&T as their service provider, they purchase an AT&T phone; if they wish to be a Verizon customer they purchase a Verizon telephone, etc. When purchasing a mobile terminal associated with a particular wireless service provider, the SIM card associated with the mobile terminal is pre-provisioned to be activated within and operate within the associated wireless service provider network. This limits customers into using particular wireless devices with particular wireless services providers.

With most electronic devices today, the user is not forced to use a particular service provider. For example, when an individual buys a television, they are not forced to use a particular cable or satellite provider. However, with mobile telephone handsets a customer is not able to select their operator of choice directly from the handset or self-activate their phone. They must purchase a phone that has been previously provisioned to operate within a particular wireless service provider's network. Thus, there would be a great benefit to enable the purchasers of mobile terminals to select the particular wireless service provider using the handset and provide the ability for self-activation through the handset.

SUMMARY

The present invention, as disclosed and described herein, in one aspect thereof, comprises a system and method for provisioning a wireless service provider through a mobile device using a SIM card within the mobile device. The mobile device accesses a server via a wireless hub using the SIM card and requests comparison data relating to a plurality of wireless service providers. The comparison data is provided to the mobile device from the server responsive to the request and displays this comparison information. A user selection is then provided selecting a particular wireless service provider using the mobile device, and the selected wireless service provider is established as the wireless service provider for the mobile device.

BRIEF DESCRIPTION OF THE DRAWINGS

For a more complete understanding, reference is now made to the following description taken in conjunction with the accompanying Drawings in which:

FIG. 4 illustrates the SIM card utilized within the mobile terminal of the process of FIG. 2;

FIG. 5 is a functional block diagram illustrating the functionalities of a mobile terminal handset for use in selecting the wireless service provider according to the system of FIG. 2;

FIG. 6 is an illustrative embodiment of a graphical user interface to enable a customer to select a wireless service provider;

FIG. 7 is a flow diagram illustrating a first embodiment of the manner in which a customer may select a wireless service provider via a handset;

DETAILED DESCRIPTION

Figure 1:
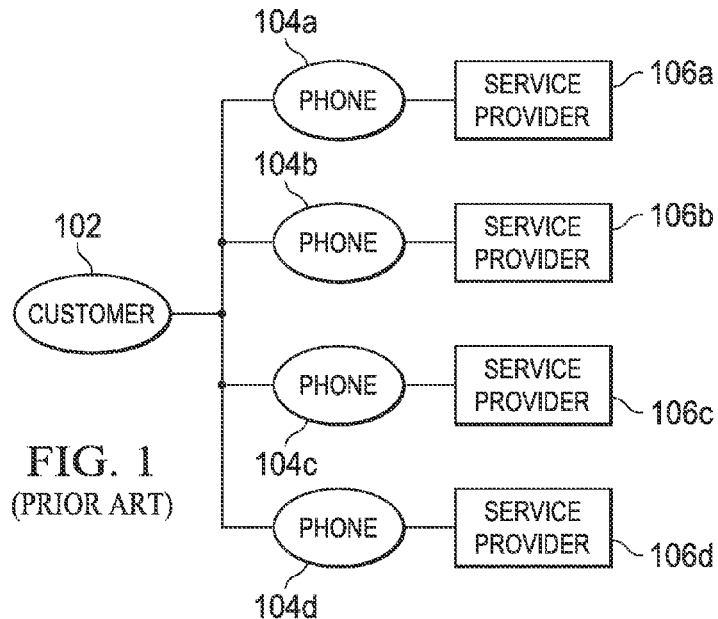
FIG. 1 illustrates the prior art method wherein a customer may purchase a particular mobile terminal that is pre-provisioned with a particular service provider.

Referring now to the drawings, wherein like reference numbers are used herein to designate like elements throughout, the various views and embodiments of a system and method for selection of wireless service provider via a mobile terminal are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, there is illustrated a prior art embodiment of the manner in which a customer purchased mobile telephone is provisioned to operate with wireless services provided by a specific wireless service provider. The customer 102 purchases a mobile phone 104 that includes a SIM card that is pre-provisioned to operate with a selected wireless service provider 106. Thus, if the customer 102 decides to have service provided by wireless service provider 106a, they are provided a mobile phone 104a that has a SIM card pre-provisioned to operate within the wireless network provided by wireless service provider 106a. Similarly, if the customer 102 desires to have a service provided by wireless service provider 106b, they are provided a mobile telephone 104b having a pre-provisioned SIM card associated with wireless service provider by 106b. The process continues in a similar manner for other service providers.

Figure 2:
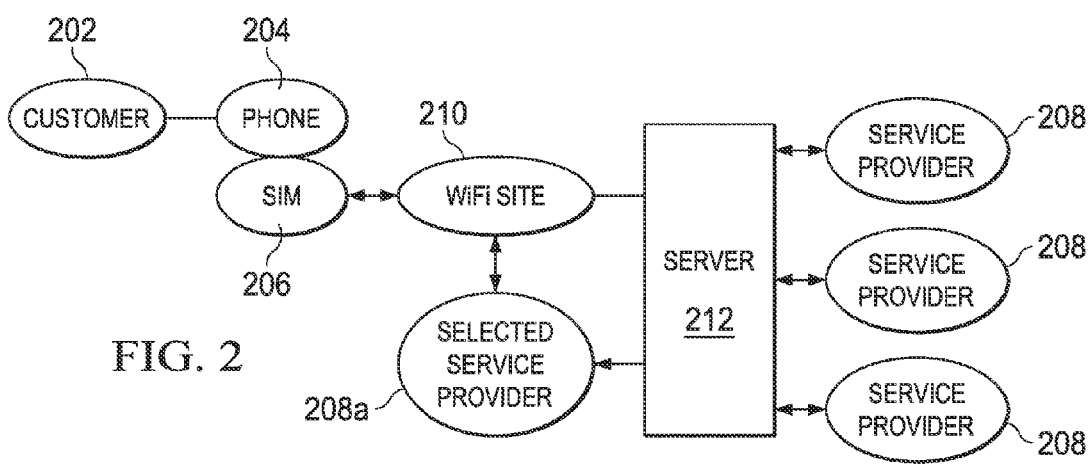
FIG. 2 illustrates the manner in which a customer may utilize a mobile terminal and associated SIM card to select a wireless service provider.

Referring now to FIG. 2, there is illustrated a process wherein rather than having the customer 202 select their wireless service provider and then using a pre-provisioned SIM card, the customer 204 purchases whichever wireless terminal 204, which may comprise a mobile telephone, PDA, pager, computer, etc., that they desire. The SIM card 206 within the wireless terminal 204 is not provisioned to operate with any particular wireless service provider 208. The wireless terminal 204 has the ability to self-select the service provider 208 associated therewith by initially establishing a Wi-Fi connection with an associated Wi-Fi hub 210. While the present description is made with respect to the establishment of a Wi-Fi connection with the wireless terminal 204, it will be appreciated that any type of wireless communications protocol for establishing an initial wireless connection with the wireless terminal 204 in order to enable its use to select a particular service provider for provisioning the wireless telephone is also acceptable.

Once a Wi-Fi connection is established between the mobile terminal 204 and a Wi-Fi hub 210, a Web proxy included within the SIM card 206 enables the mobile terminal 204 to establish a connection to a server 212 through the Wi-Fi hub 210 that provides information to the wireless terminal 204 with respect to a number of available service providers 208. Server 212 obtains information, responsive to a request from the Web proxy, with respect to each of the service providers 208 relating to the costs associated with their services, their contracts and various other types of information which would be relevant to a customer 202 making a decision as to which wireless service provider will be utilized. This information is provided back to the server 212 from each service provider 208 and then to the wireless terminal 204 through the Wi-Fi hub 210. This information is used to populate a graphical user interface that is displayed at the wireless terminal 204 and is provided by the SIM card 206 to compare the information associated with each of the wireless service providers 208. Using this comparison interface, the customer 202 chooses a selected wireless service provider 208a that they wish to provide services to the wireless terminal 204. Once a selected wireless service provider 208a has been selected, the SIM card 206a and wireless terminal 204 carry out a self-activation process for registering the wireless service provider 208a as the provisioned service provider for the wireless terminal 204.

Figure 3:
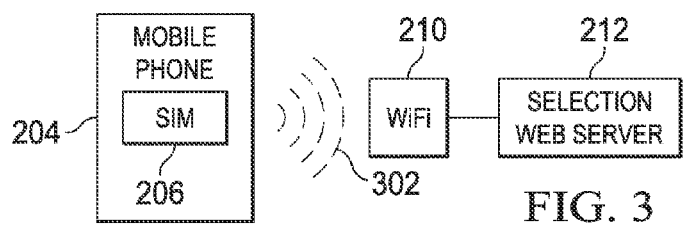
FIG. 3 illustrates the manner in which the mobile terminal interacts with a service provider selection server through a Wi-Fi hub.

Referring now to FIG. 3, there is more particularly illustrated the manner in which the mobile terminal 204 may establish a connection with a wireless service provider selection server 212 to provide the selection interface to the mobile terminal 204. The wireless mobile terminal 204 includes the non-provisioned SIM card 206 that includes a Web proxy that enables the mobile terminal 204 to establish a Wi-Fi connection 302 with a Wi-Fi hub 210. The Wi-Fi hub 210 responsive to the Web proxy server within the SIM card 206 establishes a connection with the wireless service provider selection server 212 such that the wireless service provider selection server 212 may obtain the comparison information from each of the associated wireless service providers. This selection information is provided back to the Wi-Fi hub 210 and over the Wi-Fi connection 302 to the mobile terminal 204 and associated SIM card 206. The received information is used to populate the graphical user interface that is stored within the SIM card 206 to enable the selection of a particular service provider 208.

Referring now to FIG. 4, there's illustrated the configuration of the SIM card 206 that is initially non-provisioned within the wireless terminal 204. The SIM card 206 includes the Web proxy 402 and the graphical user interface 404. The Web proxy 402 enables the mobile terminal 204 to establish a connection with a Wi-Fi hub in order to request the comparison information for various available service providers. Once the Web proxy 402 has enabled the Wi-Fi connection to retrieve the various wireless service provider information from the server and receives a provider selection from the user of the mobile telephone, the Web proxy 402 further enables the mobile telephone to register the mobile telephone with the selected service provider. The graphical user interface 404 provides a matrix for displaying various types of information with respect to available wireless service providers. The graphical user interface 404 provides this information in a side-by-side comparison format such that a user can make an informed decision as to the particular wireless service provider that they wish to register their mobile telephone.

Referring now also to FIG. 5, there is illustrated a functional block diagram of a mobile telephone handset 502 that may be utilized with the mobile telephone service provider registration process of the present disclosure. The handset 502 may include multi-frequency operation functionalities 504, multi-band operation functionalities 506 and communications functionalities 508. The multi-frequency functionalities 504 enable the mobile telephone handset 502 to operate at multiple frequencies such as 700 megahertz operation, 900 megahertz operation, PCS operation, AWS operation or any subset of these or other operational frequency bands. The multi-band functionalities 506 enable the mobile telephone to be a multi-mode handset operating with different access technologies such as, but not limited to, GSM, W-CDMA, HSPA, CDMA, EVBO, LTE or any subset thereof. In this manner, the mobile telephone handset 502 may select a variety of different available service providers that provide different frequency and access technology implementations. Communications functionalities 508 control the general operations for establishing a wireless connection from the wireless handset 502 to whichever access technology and/or frequency has been selected by a user.

Referring now to FIG. 6, there is illustrated one example of a graphical user interface that may present information for comparing various wireless service providers to each other based upon a number of factors. The rows 602 are each associated with a different service provider SP1 through SP5. Each of the rows 602 for the service provider have a plurality of columns associated therewith. Each column illustrates a different piece of information with respect to the particular service provider. For example, column 604 is the monthly fee column and lists the monthly fees that are associated with a particular service provider. The services column 606 lists the different services that are provided by a particular service provider. The information that populates the columns comes from the service provider information provided by the server 212. In this manner, each of the service providers 602 may be compared to each other to enable the user to select the particular wireless service provider that they desire to use. The selection column 608 enables the user of the wireless mobile telephone to select the service provider to register the phone with based upon the information provided within the comparison matrix by clicking on a selection field 610. This would initiate the registration of the mobile terminal with the selected wireless service provider.

Referring now to FIG. 7, there is illustrated a flow diagram describing the process for provisioning a wireless service provider using the mobile terminal in the manner described hereinabove. Initially, a customer purchases their wireless telephone at step 702. The purchased mobile terminal may include the multi-frequency, multi-band functionalities that were described hereinabove. A non-provisioned SIM card is installed at step 704 within the wireless telephone to enable the mobile terminal to establish an initial Wi-Fi connection at step 706 with a Wi-Fi hub. This could involve taking the terminal to a local Wi-Fi hotspot or any other location enabling the mobile terminal to establish the Wi-Fi connection.

Once the Wi-Fi connection is established, the Web proxy within the SIM card establishes access to a server that provides wireless service provider comparison information. Upon establishment of the connection with the server, the server fetches at step 710 the various service provider comparison information that is provided back to the mobile terminal responsive to a request from the Web proxy. The mobile terminal takes all of the provided wireless service provider information and utilizes the comparative graphical user interface matrix such as that described with respect to FIG. 6 to display the information with respect to each of the wireless service providers to the user of the mobile terminal at step 712. The user views all of the provided wireless service provider information and makes a decision with respect to which service provider they desire and selects this service provider at step 714.

Once the user has selected a particular wireless service provider, the Web proxy enables a self-registration process for the mobile terminal to register directly with the selected wireless service provider as step 716. Upon completion of the registration of the mobile terminal with respect to the selected wireless service provider at step 718, the mobile terminal is then provisioned to operate within the wireless network provided by the wireless service provider.

Figure 8:
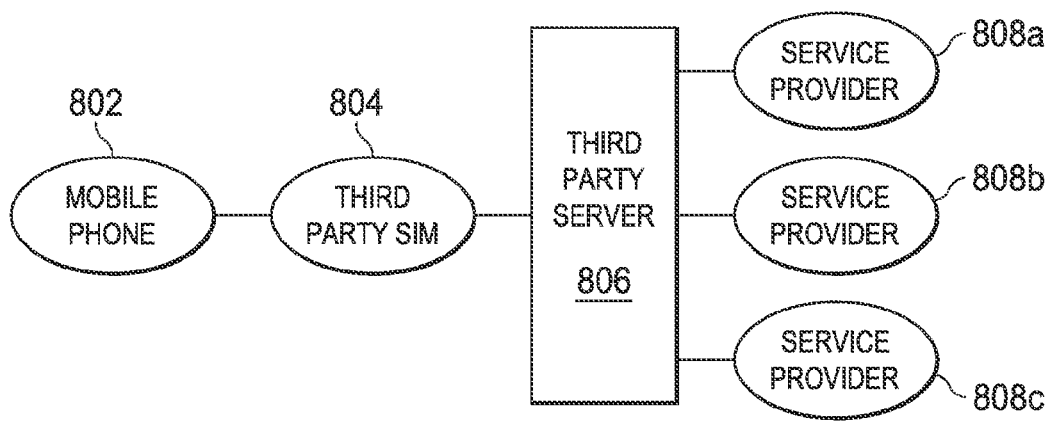
FIG. 8 illustrates an alternative embodiment of a manner for enabling a wireless mobile terminal to select a service provider.

Referring now to FIG. 8, there is illustrated an alternative embodiment of the present invention wherein rather than utilizing a Web proxy upon the SIM card to enable the mobile terminal to select a particular wireless service provider, access to a third-party server provides the ability for enabling the mobile terminal to select and register with a wireless service provider. The mobile terminal 802 has associated therewith a third-party SIM card 804 which includes information therein enabling the mobile terminal 802 to establish a connection with the third-party server 806. This connection may be established via a Wi-Fi hub or other type of wireless connection protocol. The third-party server 806 presents information to the mobile terminal 802 that provides a comparison of the requirements and benefits for a plurality of different service providers 808. Thus, rather than the service provider information being provided back to the mobile telephone 802 and displayed in a graphical user interface stored within the SIM card 804 of the mobile telephone 802, the interface is presented to the user as a Web page or other type of download from the third-party server 806. The user of the mobile terminal 802 will review this information and make a selection of the service provider 808 that the user desires based upon the provided information. The third-party server 806 then provides the registration process between the selected service provider 808 for the mobile telephone 802.

Figure 9:
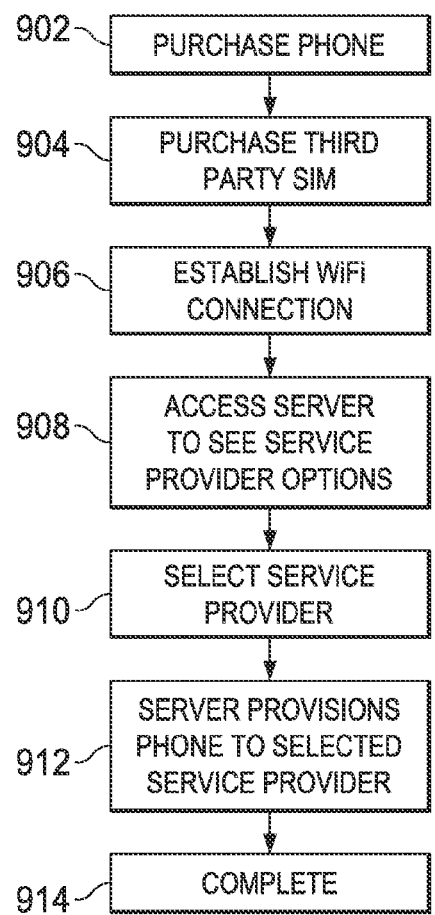
FIG. 9 is a flow diagram illustrating the process for enabling the wireless mobile terminal to select a service provider according to the process of FIG. 8.

Referring now to FIG. 9, there's illustrated a flow diagram describing the process associated with the system of FIG. 8. A user initially purchases a mobile terminal at step 902 and at the same time will purchase the third-party SIM card 904 associated with the third-party server 806. The mobile terminal establishes a Wi-Fi or other type of wireless connection at step 906 to a wireless hub and with the third-party server 806 using the information contained within the third-party SIM card. The mobile terminal 802 accesses the third-party server 806 to obtain information relating to the various service provider options at step 908. Using this information the user may select through their mobile terminal 802 a particular service provider for providing services to the mobile terminal at step 910. Responsive to the selection, the third-party server 806 assists the mobile terminal to register with the selected service provider 808. Upon completion of the registration process at step 914 the mobile terminal 802 is ready for receiving wireless communications from their selected wireless service provider.

Using the above described system and method, a user may purchase any desired mobile terminal having the required functionalities and utilizing the selected mobile terminal may establish a service provider relationship with any service provider they deem most appropriate based upon a comparison of the information provided via the purchased mobile terminal. This provides a great deal of flexibilities to a user and enables them to select a desired service provider from the device without requiring the user to purchase a particular device to go along with a desired service provider.

It will be appreciated by those skilled in the art having the benefit of this disclosure that this system and method for selection of wireless service provider via a mobile terminal provides an ability to select a service provider irrespective of the phone used. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. An apparatus for provisioning a wireless service provider, comprising:
   a wireless mobile device for establishing a connection with the wireless service provider;
   a SIM card located within the wireless mobile device enabling the wireless mobile to device to provision the wireless mobile device with a user selected wireless service provider;
   a web proxy stored within the SIM card enabling the wireless mobile device to establish a connection to obtain wireless service provider comparison information; and
   a graphical user interface stored within the SIM card for displaying the wireless service provider comparison information received at the wireless mobile device.

2. The apparatus of claim 1, wherein the web proxy further enables the mobile device to register with a selected wireless service provider responsive to a user selection received via the wireless mobile device.

3. The apparatus of claim 1, wherein the wireless mobile device further includes multi-frequency functionalities enabling the wireless mobile device to operate over a plurality of frequencies.

4. The apparatus of claim 1, wherein the wireless mobile device further includes multi-band functionalities enabling the wireless mobile device to operate in a plurality of frequency bands.

5. The apparatus of claim 4 wherein the plurality of frequency bands consists essentially of GSM, W-CDMA, HSPA, CDMA, EVBO, LTE or any subset thereof.

6. The apparatus of claim 1 further including a server for receiving a request from the wireless mobile device for wireless service provider comparison information and for obtaining the wireless service provider comparison information from a plurality of wireless service providers and for forwarding the wireless service provider comparison information to the wireless mobile device.

7. The apparatus of claim 1, wherein the wireless service provider comparison information further comprises information from a plurality of wireless service providers.

8. An apparatus for provisioning a wireless service provider to a mobile device not presently having a provisioned wireless service provider, comprising:

a wireless mobile device for establishing a connection with the wireless service provider;

a SIM card located within the wireless mobile device for configuring the wireless mobile to device to connect with a server providing comparison data for a plurality of wireless service providers when the wireless mobile device in not currently registered with the wireless service provider;

a web proxy within the SIM card for connecting the wireless mobile device to the server, wherein the web proxy generates a request to the server for the comparison data and obtains the comparison data for the plurality of wireless service providers from the server responsive to the request, the comparison data including at least a fee of each of the wireless service providers and services provided by each of the wireless service providers; and a graphical user interface stored within the SIM card for displaying the wireless service provider comparison data received at the wireless mobile device.

9. The apparatus of claim 8, wherein the web proxy further enables the mobile device to register with a selected wireless service provider responsive to a user selection received via the wireless mobile device.

10. The apparatus of claim 8, wherein the wireless mobile device further includes multi-frequency functionalities enabling the wireless mobile device to operate over a plurality of frequencies.

11. The apparatus of claim 8, wherein the wireless mobile device further includes multi-band functionalities enabling the wireless mobile device to operate in a plurality of frequency bands.

12. The apparatus of claim 11 wherein the plurality of frequency bands consists essentially of GSM, W-CDMA, HSPA, CDMA, EVBO, LTE or any subset thereof.

13. The apparatus of claim 8 further including a server for receiving a request from the wireless mobile device for wireless service provider comparison information and for obtaining the wireless service provider comparison information from a plurality of wireless service providers and for forwarding the wireless service provider comparison information to the wireless mobile device.

14. A wireless device for provisioning a wireless service provider to the wireless device not presently having a provisioned wireless service provider, comprising:

a web proxy within the wireless mobile device for configuring the wireless device to connect with a server providing comparison data for a plurality of wireless service providers when the wireless device in not currently registered with a wireless service provider, wherein the web proxy generates a request to the server for the comparison data and obtains the comparison data for a plurality of wireless service providers from the server responsive to the request, the comparison data including at least a fee of each of the wireless service providers and services provided by each of the wireless service providers; and a graphical user interface initiated by the web proxy for displaying the wireless service provider comparison information received at the wireless device.

15. The apparatus of claim 14, wherein the web proxy further enables the mobile device to register with a selected wireless service provider responsive to a user selection received via the wireless device.

16. The apparatus of claim 14, wherein the wireless device further includes multi-frequency functionalities enabling the wireless device to operate over a plurality of frequencies.

17. The apparatus of claim 14, wherein the wireless device further includes multi-band functionalities enabling the wireless device to operate in a plurality of frequency bands.

18. The apparatus of claim 17 wherein the plurality of frequency bands consists essentially of GSM, W-CDMA, HSPA, CDMA, EVBO, LTE or any subset thereof.

19. The apparatus of claim 14 further including a server for receiving a request from the wireless device for wireless service provider comparison information and for obtaining the wireless service provider comparison information from a plurality of wireless service providers and for forwarding the wireless service provider comparison information to the wireless device.

* * * * *